(No Model.)

G. SIMPSON.
WATER PURIFIER AND COOLER.

No. 423,824. Patented Mar. 18, 1890.

WITNESSES:
INVENTOR:
George Simpson
BY
ATTORNEY

UNITED STATES PATENT OFFICE.

GEORGE SIMPSON, OF PHILADELPHIA, PENNSYLVANIA.

WATER PURIFIER AND COOLER.

SPECIFICATION forming part of Letters Patent No. 423,824, dated March 18, 1890.

Application filed July 30, 1889. Serial No. 319,199. (No model.)

*To all whom it may concern:*

Be it known that I, GEORGE SIMPSON, a subject of the Queen of Great Britain, residing in the city and county of Philadelphia, State of Pennsylvania, have invented a new and useful Improvement in Water Purifiers and Coolers, which improvement is fully set forth in the following specification and accompanying drawings.

My invention relates to improvements in water purifiers and coolers; and it consists, first, in a tank provided with a heating-coil having a water-supply pipe and a discharge-pipe, the latter leading into the tank, and a gas-burner, the supply-pipe of which and the water-supply pipe being controlled by a float within the tank.

It further consists in the combination of parts herein set forth and claimed.

Figure 1:
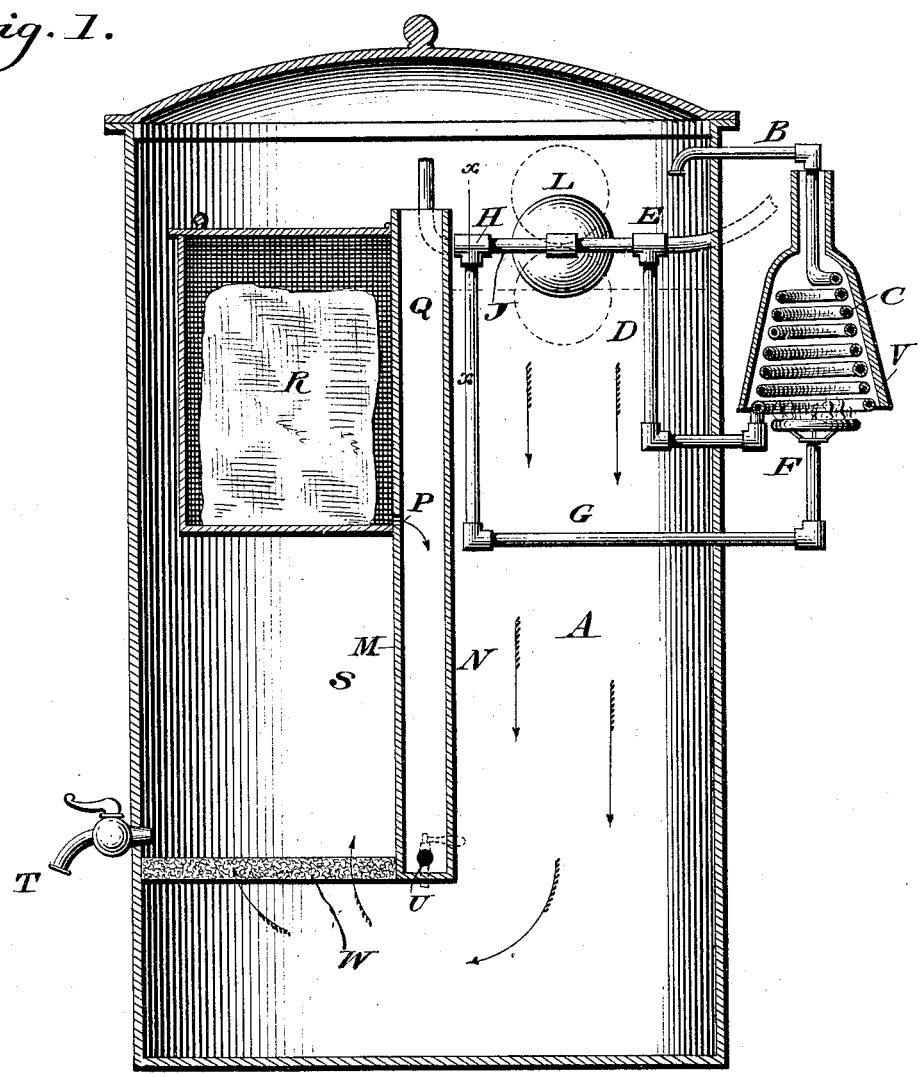
Figure 2:
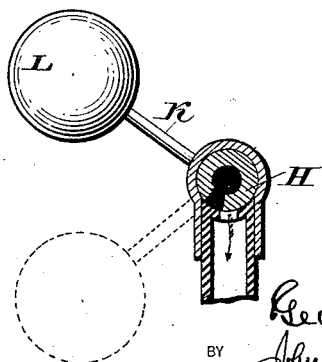

Figure 1 represents a vertical section of a water purifier and cooler embodying my invention. Fig. 2 represents a vertical section of a portion on line $x\,x$, Fig. 1, on an enlarged scale.

Similar letters of reference indicate corresponding parts in the two figures.

Referring to the drawings, A designates a tank or vessel, and B designates a pipe leading into said tank, said pipe being connected with or continuous of a coil C, which constitutes a heater for water admitted thereinto by the pipe D, the latter being in communication with a source or supply of water and provided with a valve or cock E for regulating the flow of the same into said pipe, and consequently to the heater C. Below the coil or heater C is a gas-burner F, which is connected with the gas-conveying pipe G, the latter being provided with a valve or cock H, whereby the supply of gas or other vapor fuel or burning medium to the burner may be controlled and the flame or heat accordingly regulated.

The keys or plugs of the valves or cocks E H are connected with a rotatable stem J, to which is attached the arm K of a float L. The pipes D and G may be secured to the tank A in any suitable manner, or sustained in a position adjacent to or near said tank, so that the float is within the tank A, it being evident that the heater C and burner F are properly sustained on the tank or adjacent thereto.

Within the tank A are partitions M N, which form a well and cold-air space Q, the same being in communication, as at P, with an ice or cooling chamber R, which is located in the upper end of the storage-vessel S, which vessel is in communication with the tank A at the bottom thereof.

The vessel S and well Q are provided with cocks or faucets, as at T U, for evident purposes.

The operation is as follows: The tank A and vessel S are primarily supplied with water, the cock or valve H being adjusted so that a limited quantity of gas is supplied to the burner F for maintaining a small flame thereat. When the water is taken from the vessel S, that in the tank A lowers and the float falls, whereby the cock E is opened, thus admitting water into the pipe D, and consequently into the coil or heater C. The cock H is also opened, whereby a full volume of gas is admitted to the burner F, so that the water in the coil C is heated or boiled. The hot water leaves the coil and is directed by the pipe B into the tank and from there into the vessel S, and reaches the chamber R, so as to be cooled by contact with the same. When the tank A is full, the float rises and the valve or cock of the water-pipe is rotated, so as to cut off the water. The valve or cock of the gas-pipe is also rotated, so that the full head of gas is cut off, leaving, however, a small quantity of the gas burning, so that a flame is constantly maintained, ready to be enlarged, for boiling a fresh supply of water admitted into the coil or heater, when the float again falls, the latter being raised by the withdrawal of water from the vessel S, as previously stated.

The coil or heater is surrounded by a casing V, of non-conducting material, both as a guard and preventive of loss of heat.

A diaphragm W, of filtering material, is located at the bottom or inlet end of the vessel S for evident purposes; but, if desired, the water may be filtered prior to its entrance into the pipe.

The cold-air space or well Q serves to cool the water in the tank A, as well as in the vessel S, and said space or well receives the melted ice, leaving the chamber R through the outlet or opening P and is cooled by the same.

It is evident that water may be readily prepared and purified for drinking, cooking, and other purposes by the treatment to which it is subjected, the operations being conveniently and reliably performed.

Having thus described my invention, what I claim as new, and desire to secure by Letters Patent, is—

1. In a water-purifier, a receiving-tank and a communicating storage-vessel, in combination with a heater, a gas or other burner, cocks or valves connected with said heater and burner, and a float for controlling said cocks or valves, the heater having a pipe leading from a source of supply and one leading to said tank, substantially as described.

2. A water purifier and cooler consisting of a tank having two partitions, forming a water-receiving chamber, a cold well, and a purified-water reservoir or chamber, the latter having a filtering-bottom, a heater outside of said tank, a pipe leading from a source of supply to the heater, a pipe leading from the heater to the tank, a float in the water-receiving chamber connected with a valve in the water-supply pipe, and an ice-chamber communicating with the cold well, said parts being combined substantially as described.

3. A water-purifier consisting of a tank with partitions forming a water-receiving chamber and a storage or purified-water chamber, the latter having a filtering-bottom through which the water upwardly passes into said chamber, a heater outside of said tank, a pipe leading from a source of water-supply to the heater, a pipe leading from the heater to the tank, and an automatic controlling device for said supply-pipe of the heater, said parts being combined substantially as described.

4. A water-purifier consisting of a tank having the partitions M N, forming a water-receiving chamber and a storage-chamber with an intervening cold well, a heater outside of said tank, a supply-pipe leading into said heater, and a gas-pipe, with burner, valves in said pipes, an oscillating bar secured to said valves and journaled in the sides of the tank, a float with an arm attached to said bar, and a pipe leading from said heater into said water-receiving chamber, said parts being combined substantially as described.

GEORGE SIMPSON.

Witnesses:
JOHN A. WIEDERSHEIM,
JACOB N. DONALDSON.